United States Patent [19]

Hahn et al.

[11] Patent Number: 4,548,570
[45] Date of Patent: Oct. 22, 1985

[54] EXTRUSION APPARATUS FOR PRODUCING THERMOPLASTIC PIPE

[75] Inventors: Granville J. Hahn; Raleigh N. Rutledge, both of Big Spring, Tex.

[73] Assignee: Cosden Technology, Inc., Dallas, Tex.

[21] Appl. No.: 493,839

[22] Filed: May 12, 1983

[51] Int. Cl.$^4$ .............................................. B29F 3/08
[52] U.S. Cl. .................................. 425/141; 264/40.6; 264/209.2; 425/174.6; 425/379 R; 425/381; 425/466
[58] Field of Search ............... 425/381, 380, 143, 144, 425/466, 467, 133.1, 131.1, 379 R, 141, 174.6; 264/209.8, 519-522, 40.1, 40.6

[56] References Cited

U.S. PATENT DOCUMENTS

| | | | |
|---|---|---|---|
| 2,938,231 | 5/1960 | Lowey, Jr. | 425/466 |
| 3,368,007 | 2/1968 | Palmer | 264/40.1 |
| 3,751,537 | 8/1973 | Scotto et al. | 425/144 |
| 3,761,553 | 9/1968 | Richardson | 425/141 |
| 3,767,346 | 10/1973 | Mihalik | 425/378 R |
| 3,883,279 | 5/1975 | Heyer | 264/40.6 |
| 3,940,221 | 2/1976 | Nissel | 425/381 |
| 4,249,875 | 2/1981 | Hart et al. | 425/133.1 |
| 4,252,519 | 2/1981 | Farmer et al. | 425/466 |
| 4,281,980 | 8/1981 | Hoagland et al. | 425/466 |
| 4,332,543 | 6/1982 | Fulton et al. | 425/466 |

FOREIGN PATENT DOCUMENTS

| | | | |
|---|---|---|---|
| 2234876 | 1/1973 | Fed. Rep. of Germany | 425/144 |
| 2542331 | 9/1976 | Fed. Rep. of Germany | 425/381 |
| 51-28158 | 3/1976 | Japan | 425/467 |
| 1100476 | 1/1968 | United Kingdom | 425/192 R |

*Primary Examiner*—Jeffery Thurlow
*Attorney, Agent, or Firm*—Robert H. Sproule; Roy L. Van Winkle; M. Norwood Cheairs

[57] ABSTRACT

Apparatus is disclosed for the formation of pipe comprising one or more layers of thermoplastic resin. The apparatus comprises a die housing having a bore therethrough with a mandrel longitudinally supported within the bore by radial members extending from the inside surface of the bore to provide an annular extrusion passageway defined by the inside surface of the housing and the outer surface of the mandrel. The housing includes therein a plurality of electrically resistive heating elements longitudinally positioned parallel to the extrusion passageway to selectively heat the thermoplastic material flowing therethrough in proximity to the heated section thereby increasing the laydown of thermoplastic material. Also included in the housing is plurality of radially adjustable elements having electrically resistive heating elements therein to radially reposition a moveable discharge sleeve held therebetween thereby controlling the wall thickness of the thermoplastic material passing in proximity thereto. The extrusion passageway is constricted downstream of the radial support but prior to the annular sequentially positioned feed rings to reunite the thermoplastic material after the flow disruption created by the radial support members. Also included in the mandrel is a central longitudinal passageway in communication with the inlet section of the bore for the transportation of thermoplastic material therethrough to one or more of the annular feed rings. The mouth of the mandrel bore includes a restrictor orifice therein to balance the pressure differential created therein by the constriction in the extrusion passageway.

4 Claims, 8 Drawing Figures

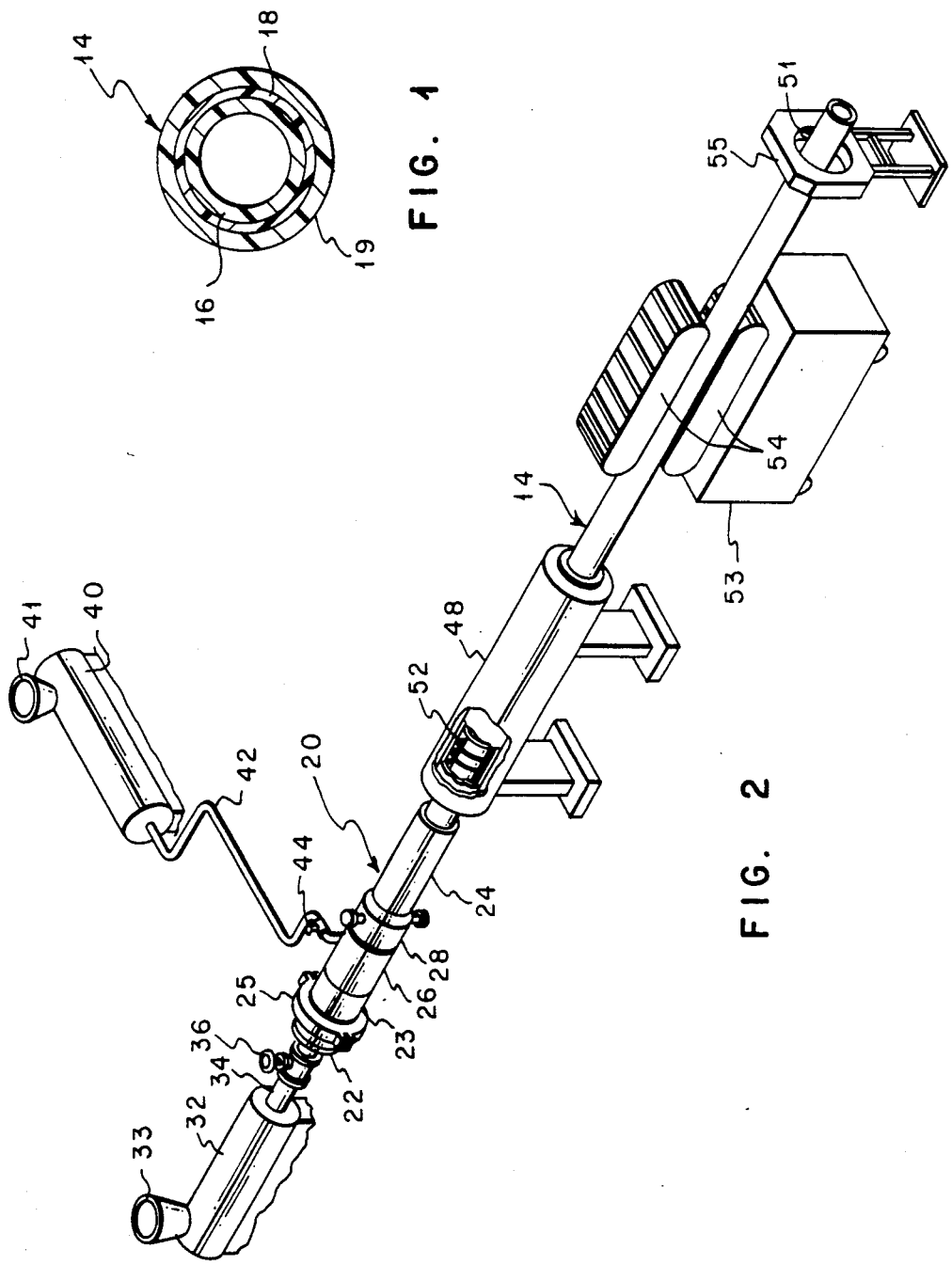

EXTRUSION APPARATUS FOR PRODUCING THERMOPLASTIC PIPE

BACKGROUND OF THE INVENTION

The present invention relates to apparatus for producing pipe having one or more layers of thermoplastic resin, and preferably having three layers comprising at least one outer layer, an intermediate layer, and at least one inner layer.

Many attempts have been made to produce a multiple layered pipe in order to combine the desirable characteristics of different thermoplastic resins. These attempts have usually involved extruding several streams of thermoplastic resins through a series of concentric tubes which are fixed relative to one another in a radial manner, such as by spiders, to define annular passages therebetween, and then subsequently joining the resultant annular layers to produce a multiple layered pipe. Pipes prepared by such processes and apparatus, however, have had spider marks thereon due to the flow interruptions caused by the many spiders necessitated in such apparatus. Moreover, such apparatus contain adjusting screws which protrude into the individual die passages for adjusting the thickness of the annular layers. These screws also interfere with the flow of the molten resin as it is being extruded causing additional marks on the pipe.

Furthermore, it is undesirable to provide an extrusion die for each layer of the desired pipe. Since high internal pressure is required for the extrusion of the highly viscous heat plastified thermoplastic material, such apparatus is subject to distortions in the die which cause undesirable nonuniformity in the thickness of each layer, unless the extrusion pressures of each layer are balanced. However, in practice, it is frequently difficult to maintain extrusion pressures constant in their proper relationship. Those types of apparatus employing a separate die for each layer thus inherently incur difficulty in controlling the thickness of each layer in the desired pipe.

Another disadvantage associated with other apparatus for the production of co-extruded plastic pipe is the inability of these apparatus to equalize the flow of thermoplastic within the die so that the heat plastified thermoplastic is applied as a continuous layer of constant thickness. This problem is particularly prevalent in those apparatus in which layers of thermoplastic are extruded through annular orifices to accomplish multiple layer laydown. In order to form a layer of constant thickness, it is absolutely essential in such apparatus that the flow of thermoplastic through the annular orifice be constant about its entire circumference.

In the extrusion of multiple layered pipe having an intermediate thin film layer of thermoplastic material, it is necessary at the point of laydown that the layers of thermoplastic material have viscosity indexes similar to that of the film layer. Any significant difference in viscosity will prevent bonding of the outer and inner layers to the film. In addition to controlling the relative viscosities, it is also necessary that each layer have a constant thickness. Failure to achieve very precise viscosity control and uniformity of thickness of each layer in pipe having one or more thin film layers, results in a product which has inferior physical properties.

U.S. Pat. No. 4,249,875 by Hart et al discloses a process and apparatus for producing multiple layered pipe utilizing a single annular die passage to lay down multiple inner and/or outer layers of thermoplastic onto a main stream of thermoplastic. An extrusion passage of suitable length was utilized to allow the bonded thermoplastic to reunite from the interruptions caused by the radial support legs of the mandrel positioned in the extrusion passage. This reuniting of the thermoplastic occurring at the same time as the laydown of the inner and outer layers resulted in some lack of uniformity in layer thickness. In addition, the Hart patent disclosed separate extruders to supply thermoplastic material to the inner and outer layers respectively. The use of separate extruders made it difficult to control the relative viscosities of the inner and outer layers because of the difficulty of operating both extruders at the same temperature.

It would be desirable, therefore, if an apparatus for the production of either single layer or multiple layered thermoplastic pipe was available which could attain very precise control of both the layer thickness and viscosity of the thermoplastic.

SUMMARY OF THE INVENTION

There is provided in accordance with the present invention a die apparatus for producing thermoplastic pipe. The die apparatus comprises a housing including a bore therethrough, and a mandrel supported within the bore and defining therein an annular extrusion passageway for transporting an annular stream of thermoplastic material therethrough. Also included are means to selectively heat a section of the housing to change the thickness of the annular stream in proximity to the heated section.

In one embodiment of the present invention there is also provided a die apparatus for producing thermoplastic pipe. The die apparatus comprises a housing including a bore therethrough, and a mandrel supported within the bore and defining therein an annular extrusion passageway for transporting an annular stream of thermoplastic material therethrough. A sleeve is engaged by the housing at the discharge end thereof with the sleeve circumscribing the mandrel to define a continuation of the extrusion passageway for transporting an annular stream of thermoplastic material therethrough. Means, such as an electrical resistive element, are utilized to selectively heat sections of the housing to change the thickness of the annular stream of thermoplastic material transported in proximity to the heated section.

In another embodiment of the present invention, there is provided a die apparatus for producing thermoplastic pipe. The die apparatus comprises a housing including a bore therethrough, and a mandrel supported within the bore and defining therein an annular extrusion passageway for transporting an annular stream of thermoplastic therethrough. A sleeve is engaged by the housing at the discharge end thereof and radially moveable therein. The sleeve circumscribes the mandrel to define a continuation of the extrusion passageway for transporting an annular stream of thermoplastic material therethrough. Also included are means, positioned circumferentially about the housing, to selectively heat a section of the housing to cause expansion of the housing section against the sleeve to radially reposition the sleeve within the housing.

BRIEF DESCRIPTION OF THE DRAWINGS

FIG. 1 is an axial sectional view of a three layer pipe;

FIG. 2 is a perspective view of one embodiment of the present invention showing the attachment of the main extruder, coextruder, vacuum sizer, pulling means and rotary scanner in relation to a coextrusion die adapted for the formation of a three layer pipe;

DETAILED DESCRIPTION OF THE PREFERRED EMBODIMENTS

Figure 3:
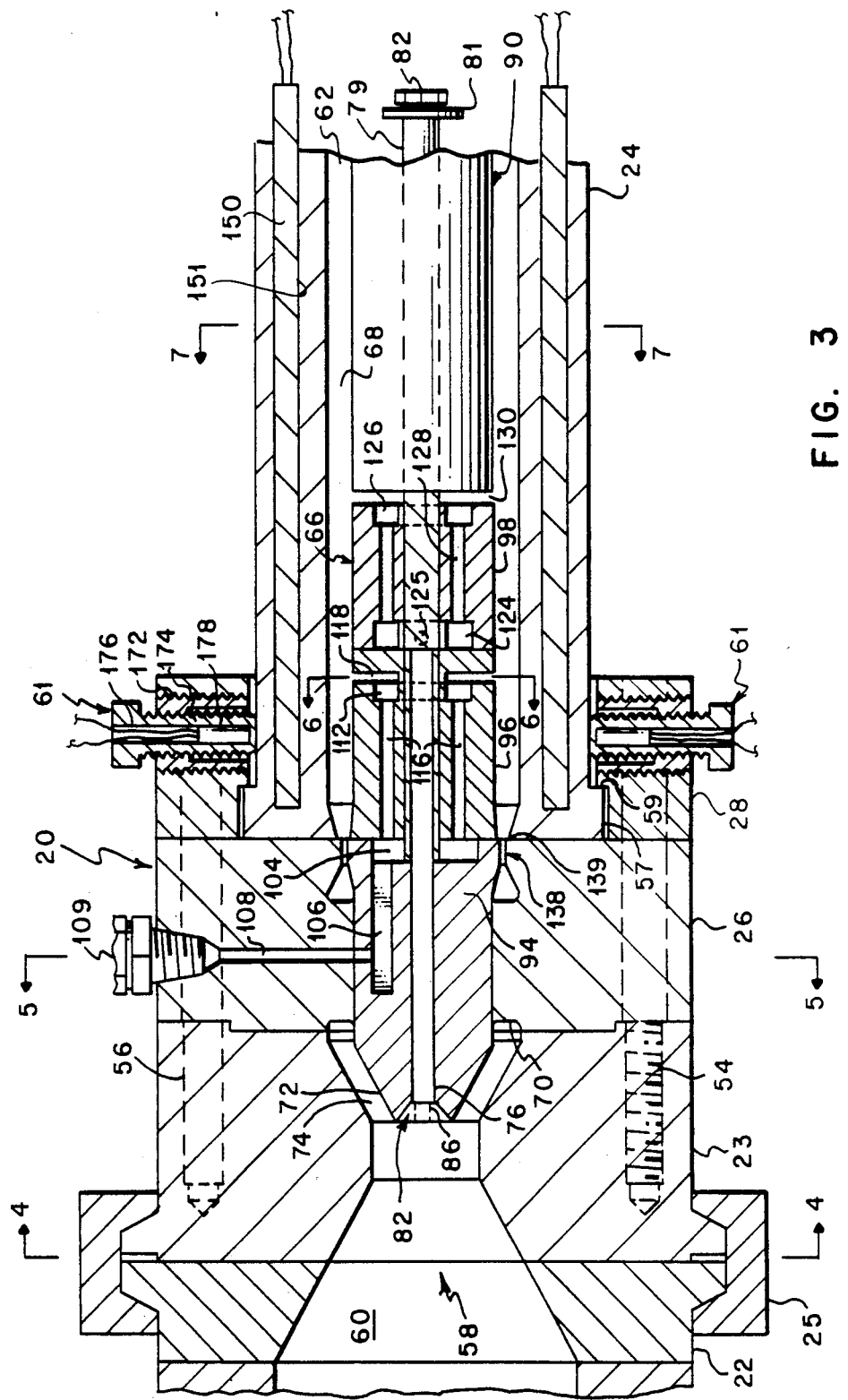
FIG. 3 is a enlarged longitudinal section through the die apparatus of FIG. 2.

Referring now to the drawings, FIG. 1 illustrates a three layered thermoplastic pipe. The pipe indicated at 14 has three layers: a barrier film middle layer 18 having a thickness of from about 5 to about 10 mils, an inner layer 14 having a thickness greater than about 20 mils, and an outer layer 19 having a thickness greater than about 20 mils. It should be appreciated that the thicknesses of the outer layer 19 and inner layer 16 will depend on the desired total wall thickness of the pipe.

Pipe 14 is produced by the apparatus illustrated in FIG. 2 wherein a die apparatus indicated at 20 includes an annular transition body 22 and an annular discharge sleeve 24. Interposed between sections 22 and 24 is an annular die inlet body 23 positioned adjacent to and downstream of transition body 22; an annular spider body 26 positioned adjacent to and downstream of die inlet body 23, and an annular sleeve adjustment body 28 positioned adjacent to and downstream of spider body 26. Transition body 22 is connected to inlet body 23 by connector ring 25. A main extruder 32, including feed hopper 33, is connected to die apparatus 20 at transition body 22 by feed conduit 34. Control valve 36 is used to adjust the pressure of molten material from extruder 32. A coextruder 40 including feed hopper 41 is connected to die apparatus 20 at spider body 26 by feed conduit 42. Control valve 44 regulates flow through conduit 42. A heat exchanger (not shown) may be positioned between main extruder 32 and die apparatus 20 in communication with feed conduit 34 to obtain more precise control over the temperature of the material exiting from main extruder 32.

Also shown in FIG. 2 is a vacuum sizer 48 which preferably is utilized in conjunction with the die apparatus of the present invention to control the diameter of the pipe 14. The vacuum sizer 48 is constructed to obtain in approximately the first half of its length, a sizing die 52 in which the extruded pipe 14 passes immediately after its exit from discharge sleeve 24 through discharge passage 62. (FIG. 3) The sizing die 52 functions to adjust the extruded pipe to its finished size. The latter half of the vacuum sizer 48 constitutes a cooling chamber, not shown, also maintained under vacuum. In this chamber, the final extruded and now sized pipe is cooled as closely as possible to ambient temperature in order to further solidify the thermoplastic materials of each of the layers of the pipe 14. Cooling is suitably achieved by contacting the extruded article with a fine spray of cooling water. Alternatively, cooling may be achieved by immersing the pipe 14 in a water bath.

Downstream of the vacuum sizer 48 is a pipe pulling means 53 for pulling the pipe 14 from the sleeve 24 through the vacuum sizer 48 and along the apparatus line. Pipe pulling means 53 may comprise a pair of opposing rotary treads 54 which engage the pipe 14 therebetween to impart horizontal movement to it. The rotational velocity of treads 54 may be adjusted to increase the horizontal velocity of pipe 14 exiting discharge sleeve 24 causing the pipe 14 to stretch axially between die apparatus 20 and vacuum sizer 48, thereby reducing the wall thickness of pipe 14 about 12 to 15%. This linear stretching decreases the wall thickness of pipe 14 and prepares the pipe for entry into vacuum sizer 48.

Downstream of pipe pulling means 53 is a rotary scanner 55 such as the one manufactured by NDC Systems utilizing probe 51 which rotates 360° about the surface of pipe 14 to continuously display and record the wall thickness of pipe 14.

Referring now to FIG. 3 which illustrates a longitudinal section of die apparatus 20, there is illustrated a transition die body 22 at the left end and a discharge sleeve 24 at the right end. Interposed between die sections 22 and 24 are inlet body 23, spider body 26, and sleeve adjustment body 28 held together in end-to-end relationship by bolts 54 engaged in threaded holes 56. Discharge sleeve 24, concentrically positioned within sleeve adjustment body 28, includes an annular ridge 57 which is engaged by annular lip 59 of sleeve adjustment body 28 to hold the discharge sleeve 24 against spider body 26. The outer diameter of discharge sleeve 24 is smaller than the inside diameter of sleeve adjustment body 28 to allow sleeve 24 about 5 to 7 mils radial movement therein. Circumferentially positioned about sleeve adjustment body 28 are a plurality of sleeve adjusting means indicated at 61 for radially aligning sleeve 24 within adjustment body 28. Sleeve adjusting means 61 includes outer bolts 172 radially positioned around and threadably engaged in sleeve adjustment body 28. Inner bolts 174 are axially aligned with and threadably engaged in outer bolts 172 to abut sleeve 24 and to radially reposition sleeve 24 by rotation of bolts 174. Each bolt 174 includes a receptacle 176 for receipt of a heating element 178 longitudinally therewithin. Heating element 178 comprises an electrical resistance cartridge heater arranged to selectively heat and radially expand bolt 174 to further radially reposition sleeve 24. It should be noted that the majority of the repositioning will be accomplished manually by rotation of inner bolt 174 within outer bolt 172. However, utilizing a bolt 174 made out of carbon steel having a diameter of about 1⅛ inches and heated by heater cartridge 178 across a length of about 4 inches, linear expansion of up to about 10 mils is possible. Other materials such as brass and aluminum also provide good expansion when heated. It should be appreciated that sleeve adjusting means 61 is not limited to the use of bolts. Any element which can be incorporated into the housing or which is integrally formed as a part of the housing and which expands when heated is within the scope of this invention. Heater cartridge 178 is commercially available and may be selected for the desired wattage, voltage, and length. A sufficient number of sleeve adjusting means 61 can be used to provide precise radial adjustment about the circumference of sleeve 24. Generally, eight sleeve adjusting means 61 radially positioned equidistant around the circumference of sleeve 24 are sufficient when extruding pipe from 2 to 6 inches in diameter.

Discharge sleeve 24 also includes a heating means comprising a plurality of electrical resistance cartridge elements 150 disposed within receptacles 151 of discharge sleeve 24 about the circumference thereof and positioned parallel to extrusion passageway 68. Preferably, the cartridge heaters 150 will be approximately the same length as sleeve 24 to provide heat along the entire length thereof. It has been found that heating arcuate sections of the discharge sleeve 24 possibly arising from the consequent reduction in the polymer's flow viscosity, increases the laydown of thermoplastic material flowing in proximity to the heating section. A sufficient number of heater cartridges 150 should be used to provide heat to the entire circumference of sleeve 24 if desired. Generally, eight heater cartridges equidistantly positioned within sleeve 24 are sufficient for extruding pipe from 2 inches to 6 inches in diameter.

Figure 7:
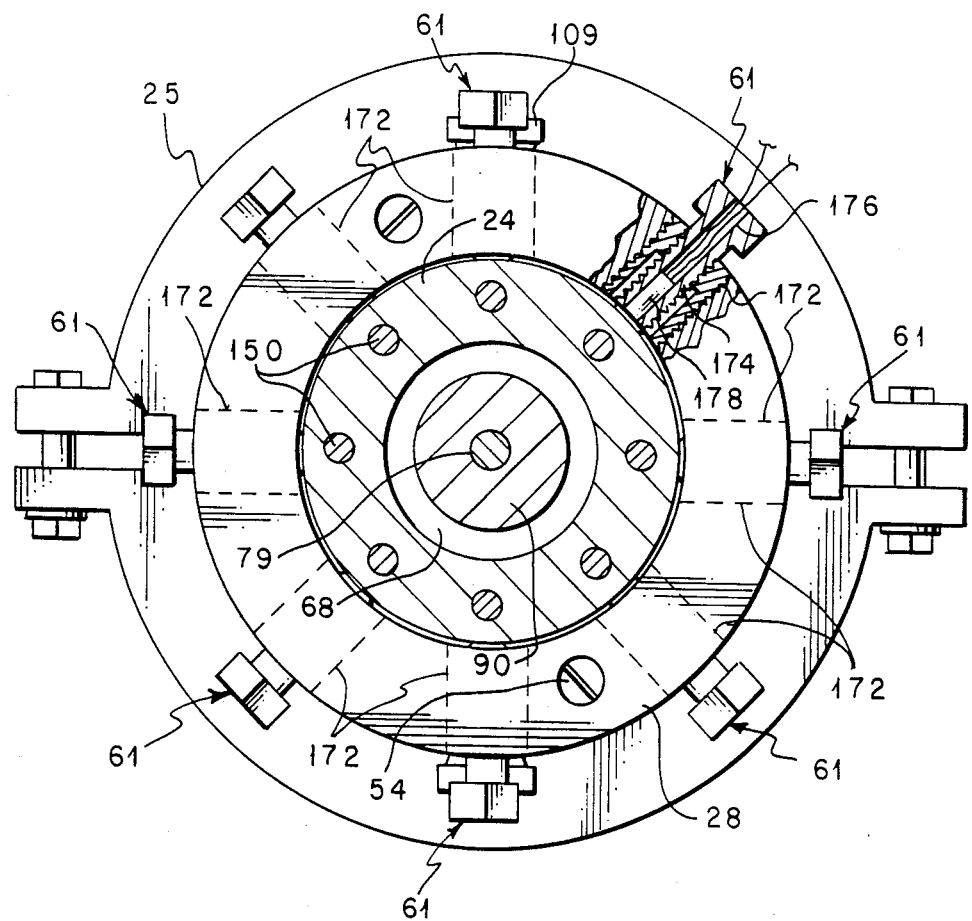
FIG. 7 is an axial sectional view of the discharge sleeve and mandrel discharge section taken along line 7—7 of FIG. 3.
Figure 8:
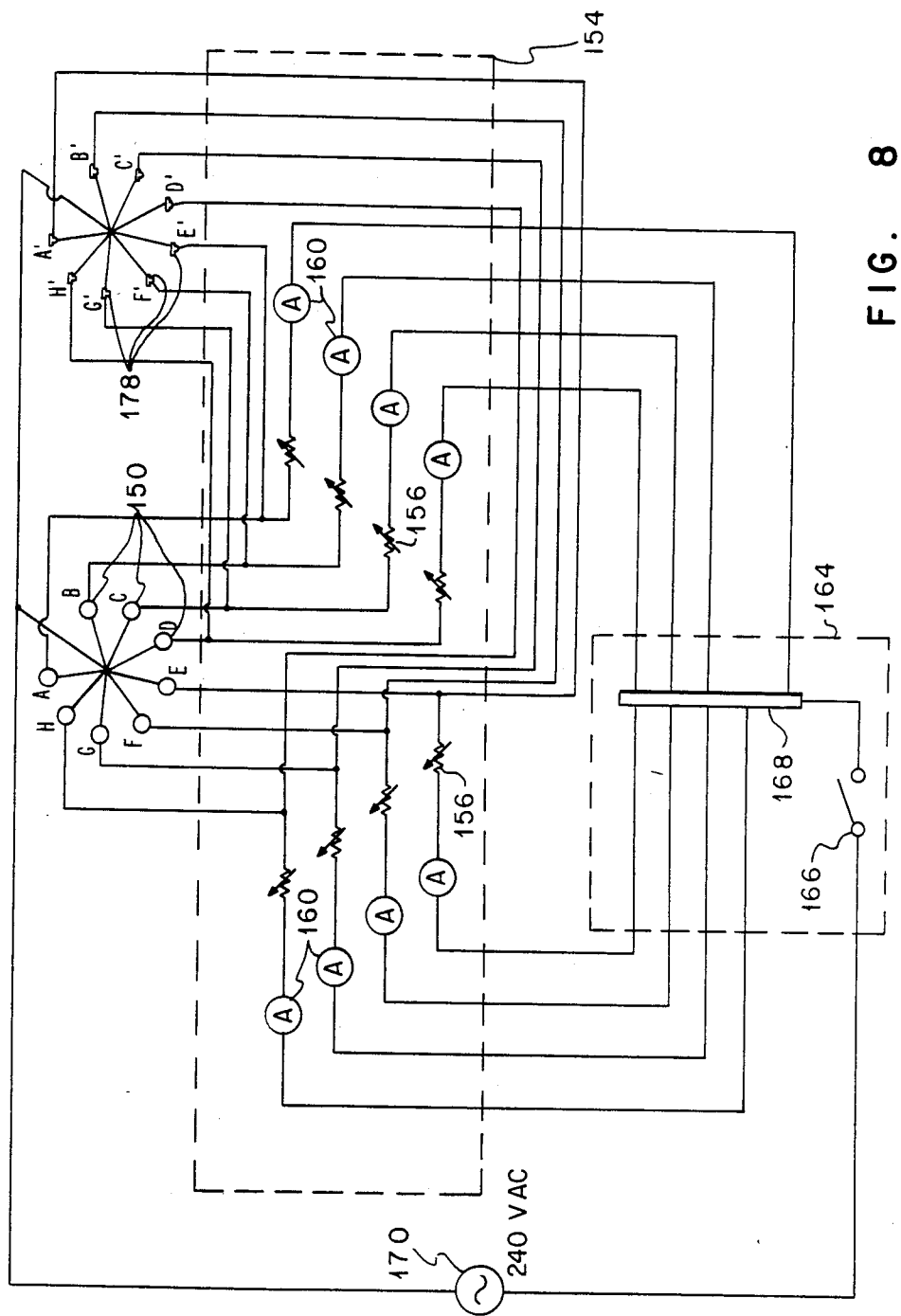
FIG. 8 is a schematic of the circuit for supplying electrical power to the resistive heating elements.

As shown in the schematic of FIG. 8, each heater cartridge 150 and 178 may be individually controlled by variable resistors 156 and monitored by ammeters 160 which are connected in series therewith. In order to obtain uniform adjustments in pipe wall thickness, individual sleeve heater cartridges 150 are longitudinally aligned with individual sleeve adjusting means 61 about the circumference of sleeve 24 (See FIG. 7). As can be seen from FIG. 8, each sleeve heater 150 is electrically connected to a bolt cartridge heater 178 which is positioned 180° across therefrom so that when electrical current is applied through each variable resistor 156, the adjustments caused by sleeve heaters 150, (increased laydown) are complementary to adjustments caused by the heater bolts 174 positioned 180° across from the sleeve heaters (radial repositioning of the sleeve 24 to increase laydown). Therefore in FIG. 8, sleeve heater 150D, for example, is electrically connected with bolt cartridge heater 178H' resulting in decreased laydown in the area of heater 178H' and increased laydown in the area of heater 150D. Variable resistors 156 and ammeters 160 are positioned on a control panel 154. Adjacent to control panel 154 is junction box 164 including an on/off switch 166 and a distribution bus 168 for directing the current from AC power supply 170 to the individual heater cartridges 150. In an alternate embodiment, the sleeve heaters 150 and bolt cartridge heaters 178 have separate controls, i.e. separate resistors 156 and ammeters 160 for each sleeve cartridge heater 150 and bolt cartridge heater 178 respectively to obtain more precise control over the wall thicknesses of pipe 14.

Figure 4:
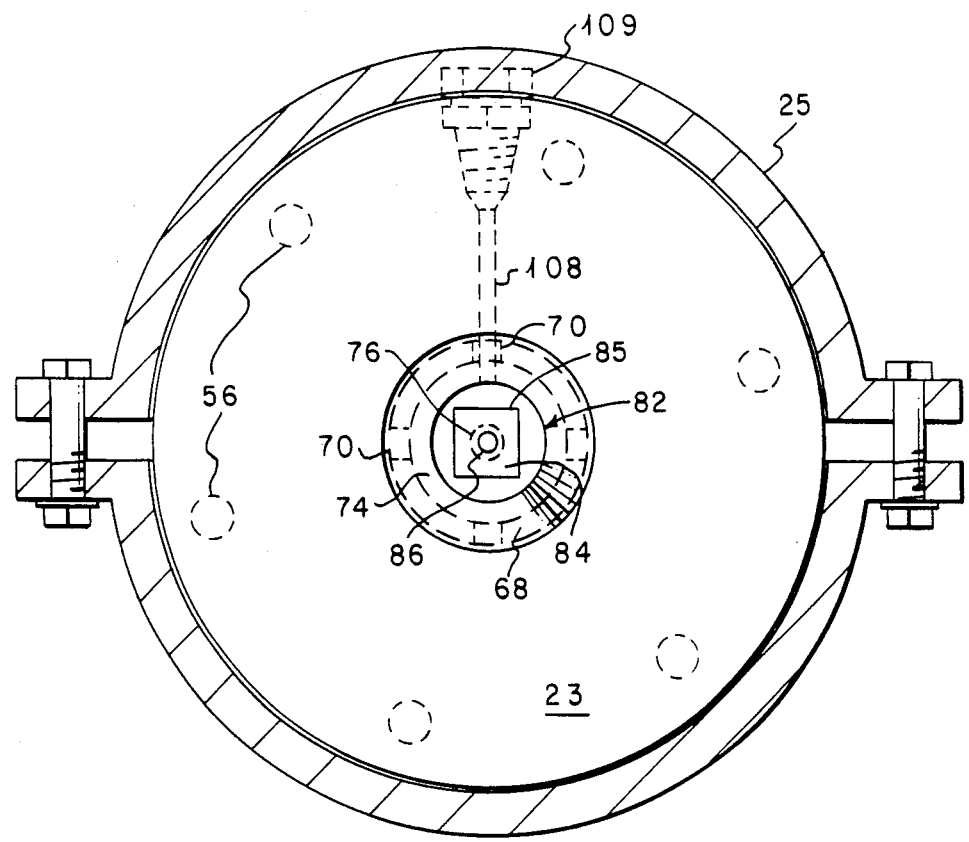
FIG. 4 is an axial sectional view of the left end face of the die inlet body and mandrel cone section on a line 4—4 of FIG. 3.

Returning to FIG. 3, longitudinally traversing through die apparatus 20 is a die bore indicated at 58 including an inlet passageway 60 at the left end of die apparatus 20 and outlet passageway 62 at the right end thereof. A mandrel indicated at 66 is longitudinally disposed inside bore 58 to define an annular extrusion passageway 68 formed between the outer surface of mandrel 66 and the inner surface of die apparatus 20. The mandrel 66 is equidistantly supported within bore 58 by spider legs 70 radially extending from the inner surface of spider body 66 into bore 58. Mandrel 66 includes a conical nose 72 positioned in proximity to inlet 60 of bore 58. Inlet 60 of bore 58. Inlet 60 is in direct communication with main extruder feed line 34. Inlet 60 narrows prior to conical nose 72 to provide a transition zone from the larger main extruder discharge line 34. Inlet 60 diverges in spaced relationship to conical nose 72 to define an extrusion inlet passageway 74. Also included in mandrel 18 is a central feed passage 76 axially disposed therein and in direct communication with inlet 60 through the tip of conical nose 72. Conical nose 72 (further illustrated in FIG. 4) includes a feed restrictor 82 comprising a threaded plug 84 and a constrictor orifice 86 extending therethrough in direct communication between feed passage 76 and inlet 60. Threaded plug 84 has formed therein an Allenhead socket 85 for the receipt of an Allen wrench for removal of plug 84 and replacement by other plugs having orifices of different diameters.

Referring again to FIG. 3, mandrel 66 includes at the right end thereof positioned within die discharge sleeve 24 a cylindrically shaped mandrel discharge section indicated at 90. Positioned between conical nose 72 and discharge section 90 are spider section 94, first laydown section 96 and second laydown section 98 which are joined in end-to-end relationship by a bolt 79 axially centrally disposed therethrough. Washer 81 and nut 82 at the discharge end of discharge section 90 secure the mandrel sections together on the bolt. The discharge portion 62 of extrusion passageway 68, as defined by discharge sleeve 24 and discharge section 90, determines both the total wall thickness and the diameter of the thermoplastic pipe. Therefore both sleeve 24 and discharge section 90 are replaceable with similar but different-sized elements when requirements dictate a pipe having a different wall thickness and/or diameter. Central feed passageway 76 is axially disposed within bolt 79 through laydown sections 96, 98, and discharge section 90.

Figure 5:
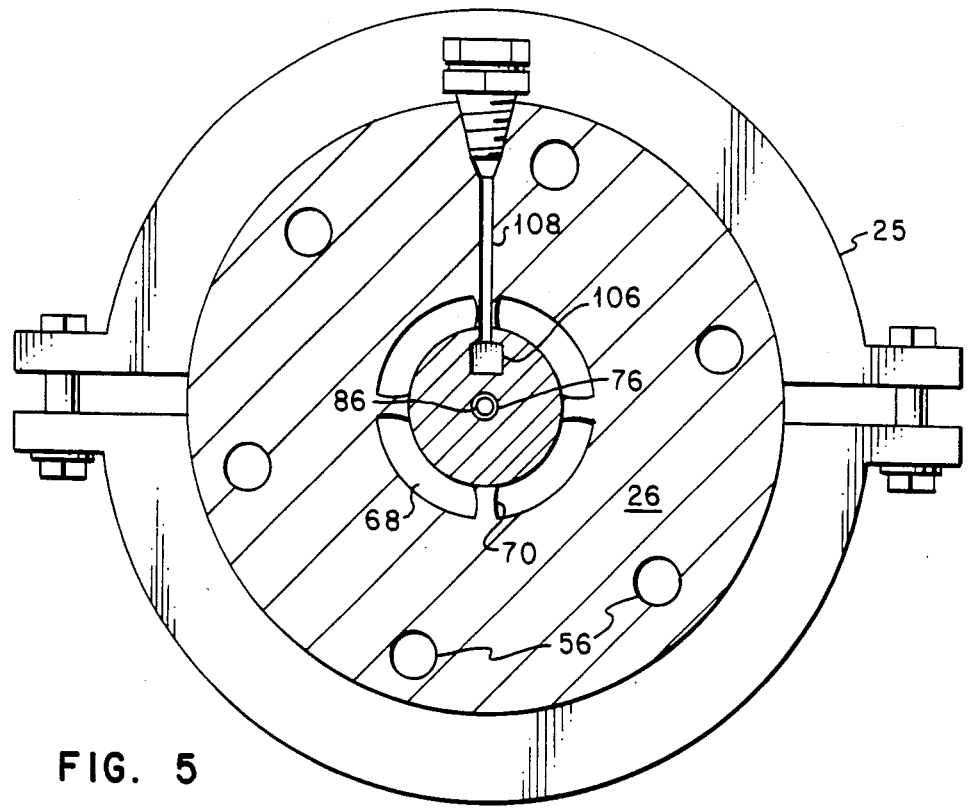
FIG. 5 is an axial sectional view of the spider body and mandrel spider section taken along line 5—5 of FIG. 3.

Spider section 94 includes a longitudinal feed passage 106 comprising a slotted passage (see FIG. 5) extending therethrough and terminating in a reservoir chamber 104 milled into the right end face of spider section 94 and annularly disposed about bolt 79. In direct communication with longitudinal feed passage 106 is inlet passage 108 passing vertically through spider body 26 and spider leg 70 which in turn is in direct communication with feed conduit 42 through feed connector 109 for the transport of feed from coextruder 40 to die 20.

Figure 6:
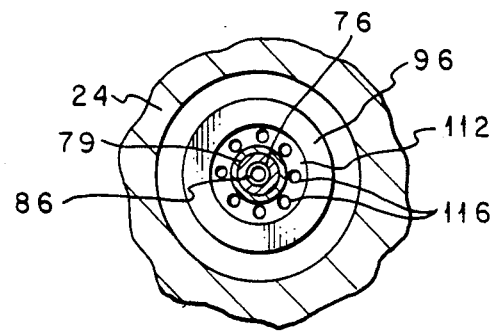
FIG. 6 is a partial axial sectional view of the right end face of the mandrel first laydown section taken along line 6—6 of FIG. 3.

Abutting spider section 94 in a direct end-to-end relationship downstream thereof is first laydown section 96 which includes an annular chamber 112 milled into the right end face thereof and annularly disposed about bolt 79. Also included in section 96 are individual feed equalizer ports 116 (see FIG. 6) located parallel to bolt 79 and circumferentially disposed thereabout in direct communication with annular reservoir chamber 104. Also milled into the right end face of first laydown section 96 and further defined by the left end face of second laydown section 98 is an annular laydown orifice 118 disposed within first laydown section 96 and providing a passageway between annular feed chamber 112 and extrusion passage 68.

Located downstream of the first laydown section 96 directly adjacent thereto in end-to-end relationship is second laydown section 98. Included in second laydown section 98 is annular reservoir chamber 124 comprising an annular space milled therein in direct communication with central passageway 76. A plurality of distribution holes 125 radially connect central passageway 76 with annular feed chamber 124. At the right end face of second laydown section 98 is annular feed chamber 126 milled therein and in communication with annular reservoir chamber 124 through equalizer ports 128. Also milled into the right end face of second laydown section 98 and further defined by the left end face of discharge section 24 is annular laydown orifice 130 connecting annular feed chamber 126 with extrusion passageway 68.

An important part of the apparatus is the constriction of extrusion passageway 68 located between spider legs 70 and the first laydown orifice 118. As shown in FIG. 3, the extrusion passageway constriction indicated at 138 is formed by the convergence of the side walls of mandrel 66 toward an inner annular shoulder formed in sections 26 and 24. The purpose of the extrusion passageway constriction 138 is two-fold: (1) to reunite the thermoplastic material in extrusion passage 68 after it has been separated by the radial spider legs 70; and, (2) to reduce the back pressure in main extrusion passageway 68 downstream of restrictor distribution orifice 130 to allow more consistent laydown of the secondary layers, and also an easier and more precise radial adjustment of discharge sleeve 24. That portion of constriction 138 between mandrel 66 and discharge sleeve 24 which forms the narrowest section of constriction, illustrated at 139, is of sufficient width to maintain communication of thermoplastic through passageway 68 during radial repositioning of sleeve 24. Other apparatus have utilized constrictions downstream of the last laydown orifice to help reknit the layer of thermoplastic separated by spider legs 70. Such constriction would not operate successfully in the present invention because pressure created in passageway 68 by the constriction was sufficient to interfere with radial adjustment of discharge sleeve 24. It should be appreciated, however, that the pressure drop in extrusion passage 68 across discharge sleeve 24 should be between about 400 to 600 psi to assist in the bonding together of the individual layers of the pipe. In addition, the diameter of constriction 138 should be such that a pressure drop from about 400 to 600 psi across constriction 138 is achieved. Generally, such a pressure drop across constriction 138 is achieved when forming pipe having diameters of from 2 to 6 inches by reducing the total cross sectional area of extrusion passage 68 at constriction 138 to about one square inch. Generally, constriction 138 should be at least one inch in length at its narrowest point to ensure adequate rejoining of the thermoplastic melt.

By referring first to FIG. 2, the operation of the apparatus proceeds as follows: thermoplastic material is loaded into feed hopper 33 and melted in main extruder 32. The main extruder 32 and coextruder 40 may be a screw extruder or rotary extruder of a design which is familiar to those persons skilled in the art. The apparatus described herein can be employed to produce a multiple layered pipe with a wide range of thermoplastic materials, including all extrudable plastic materials. Examples of such materials include cellulose esters and ethers such as ethyl cellulose acetate; vinyl and vinylidene polymers and copolymers such as polymers and copolymers of vinyl chloride, vinyl acetate, vinylidene chloride, ethylene vinyl alcohol, polyvinyl alcohol; and polymers and copolymers of acrylic and methacrylic esters; polymers and copolymers of olefins, such as ethylene, propylene, and butylene; polymers and copolymers of styrene, 2-methyl styrene and their mixtures of elastomeric copolymers; polyamides; polycarbonates; polyaldehydes, polyethers; polyurethanes; polyesters; natural and synthetic elastomers; and silicon resins and elastomers, polyethylene terephthalate, and polyethylene terephthalate glycol. Preferably, however, polyethylene terephthalate, ethylene vinyl alcohol, or the polystyrenes and their copolymers and elastomers are employed, such as polystyrene, styrene-acrylonitrile-copolymers (SAN), styrene-butadiene-acrylonitrile-copolymers (ABS), and methacrylate-styrene-rubber copolymers.

These plastic materials can, of course, be used in admixture with fillers, plasticizers, colorants, or other ordinary additives, provided they are in a state permitting melt extrusion.

In a preferred embodiment, moreover, these plastics are combined to take advantage of the desirable properties of each thermoplastic. By way of example of desirable properties, there may be mentioned mechanical strength, resistance to shock, thermal properties, transparency, opacity, resistance to chemicals, impermeability to liquids, gases, and odors, ease of working, ability to receive printing or decoration, etc. Particularly preferred according to the present invention is a three layered pipe having an outer layer of polyethylene terephthalate, an intermediate barrier film of ethylene vinyl alcohol, and an inner layer of polyethylene terephthalate.

After discharging from extruder 32 through line 34, the melt enters die body 20 through inlet 60. Referring now to FIG. 3, the thermoplastic melt then flows through inlet 60 where it subsequently impacts conical nose 72 of mandrel 66. A portion of the thermoplastic melt continues axially through restrictor orifice 86 and into axial passageway 76 through radial orifice 125 to annular reservoir chamber 124 of the second laydown body 98. The other portion of the solid cylindrical melt impacts conical nose 72 and is axially pierced, radially separated and directed through extrusion inlet passageway 74 and into extrusion passageway 68. It should be appreciated that upon entering extrusion passageway 68, the melt will contact spiders 70 located therein causing the thermoplastic melt to separate as it flows around the spider legs 70. In conventional extrusion dies, the spider legs are positioned at a point early in the extrusion process before a multiple layered annular stream is formed. These apparatus provide a length of uninterrupted extrusion passageway after laydown of the multiple layers to allow the objectionable marks created by the spiders to be reunited. Generally, the uninterrupted passageway was provided through the use of a mandrel and a surrounding sleeve of suitable length to allow the bonded layers of thermoplastic to stabilize before exiting the die body. We have found that such "reknitting" or rejoining of the thermoplastic outer layer after it has become part of a multi-layered stream creates a lack of uniformity in the layer thickness. In the present invention extrusion passageway 68 has been constricted subsequent to or downstream of spider legs 70, but prior to the laydown of the multiple layers. We have found that by using constriction 138, the reknitting of the thermoplastic melt and elimination of the objectionable spider marks can be accomplished prior to the formation of the multiple layers.

Working in combination with main extruder 32 is a second extruder, or coextruder 40 depicted in FIG. 2, which receives thermoplastic material through feed hopper 41 and transforms it into a melt. The thermoplastic melt exits coextruder 40 through feed line 42 and control valve 44 into spider body 26.

Referring now to FIG. 3, spider body 26 receives the thermoplastic melt through line 42 and connector 109, having a passageway therein in direct communication with inlet passageway 108. The thermoplastic melt continues through passageway 108 and longitudinal feed passage 106 into annular reservoir chamber 104. In annular reservoir chamber 104 the flow rate of thermoplastic melt is decreased and uniformly distributed about reservoir chamber 104 due to the buildup of thermoplastic material at feed equalizer ports 116 caused by the comparatively smaller diameter thereof. It should be remembered that longitudinal feed passage 106 is oversized to allow an increased flow rate of thermoplastic material into reservoir chamber 104. The decreased flow rate of thermoplastic melt through feed ports 116 provides a sufficient buildup of thermoplastic material therein to ensure complete distribution of thermoplastic material about the annulus of reservoir chamber 104. The melt is then uniformly distributed through feed ports 116 to annular feed chamber 112. From annular feed chamber 112 the thermoplastic melt flows outwardly through laydown orifice 118 into extrusion passageway 68. The use of feed equalizer ports 116 to equalize flow to the annular feed ring is further described in U.S. Pat. No. 4,249,875 incorporated herein by reference. As the melt from orifice 118 enters extrusion passageway 68 it lays down on the inner surface of the stream of thermoplastic melt entering extrusion passageway 68 from inlet 60 through feed passage 74, thereby forming a two-layer thermoplastic flow comprising outer layer 19 and middle layer 18 of pipe 14.

Thermoplastic melt from main extruder 32 flows through constrictor orifice 86 and central feed passage 76 into annular reservoir chamber 124 of the second laydown body 98 via ports 125. The annular reservoir chamber 124 acts in a manner similar to annular reservoir chamber 104 to equalize and distribute the thermoplastic melt to feed equalizer ports 128. From equalizer ports 128 the thermoplastic melt flows axially to annular chamber 126 where it is radially distributed through laydown orifice 130 into extrusion passageway 68, where it lays down on the inner surface of the two layer thermoplastic melt flowing downstream therein to form inner layer 16 of pipe 14.

It should be appreciated that constriction 138 will create a back pressure upstream thereof in extrusion passageway 74 due to the reduced area for flow of thermoplastic melt therethrough. The flow rate of melt through extrusion passage 68 is decreased, resulting in a corresponding increase in the flow of thermoplastic material through central passageway 76. In order to remedy the flow imbalance, a central feed passage restrictor 82 is placed in the mouth of bore 76 to equalize the flow in bore 76 and extrusion passageway 68. The diameter of restrictor orifice 86 will depend on several factors, including the cross-sectional area of extrusion passageway 68, the diameter of bore 76, and the viscosity of the thermoplastic. Any final adjustments of restrictor orifice 86 can be based on trial and error by observing the layer thicknesses displayed and recorded by rotary scanner 55. If, after observing the readings from the rotary scanner 55, it can be seen that the outer layer 19 is too small in relation to inner layer 16, a plug 84 having smaller orifice 86 can be substituted to increase the back pressure in center passage 76. On the other hand, if outer layer 19 is too thick, then a plug 84 having a larger orifice 86 can be used. Adjustments in the thickness of outer layer 19, inner layer 16 or in the concentricity of pipe 14 also may be performed by rotation of sleeve adjusting means 61.

Additional adjustments in the thickness of outer layer 19 are performed by increasing the current flow to the desired heater cartridges 150, and/or 178. If a particular arcuate section of pipe 14 is shown to be thinner than the rest thereof, the variable resistor 156 corresponding to that section is adjusted to increase the current flowing to the heater cartridge by reference to ammeter 160. Generally, some current will be directed to all cartridge heaters 150 so that sleeve 24 is slightly heated at all times. This allows for both increases and decreases in thermoplastic laydown by increasing or reducing current to the appropriate heater cartridges 150, 178.

Although not wishing to be bound by the theory of operation, it is believed that when a thin area appears in a section of the finished pipe 14, the increased heat applied to sleeve heater cartridge 150 will cause the thermoplastic in proximity to the heated section of sleeve 24 to become less viscous and to flow at a faster rate. The faster flow rate increases the amount of thermoplastic material at that location as compared to the remaining lesser heated sections of the extrusion passageway 68. In addition, the radial repositioning of sleeve 24 due to expansion of the appropriate heater bolt 174 diametrically opposite the thin section of melt will increase the width of that arcuate portion of passageway 68 in proximity to the heated section of sleeve 24, thereby causing increased laydown of thermoplastic material therein.

Although the operation of heater cartridges 150, 178 have been described in the formation of multiple layered pipe, it should be appreciated that the same principles utilizing heat to control the rate of flow of thermoplastic and width of the main extrusion passageway 68 will apply to the formation of one layer thermoplastic pipe. Production of one layer pipe utilizing the apparatus illustrated in FIG. 3 is accomplished by closing valve 44 to prevent the flow of material from coextruder 40. Threaded plug 84 is replaced by a solid plug having no orifice and forming a conical point to align with the taper of conical nose 72 to better separate and distribute the thermoplastic material flowing thereover. Rotary scanner 55 is observed to ascertain the layer thickness of the one layer pipe 14 transported therethrough. If any discrepancy is observed in the layer thickness, current is applied to the appropriate sleeve heater cartridge 150 and/or opposed heater bolt cartridge 178 to obtain additional laydown of thermoplastic material thereon.

Although several specific preferred embodiments of the present invention have been described in the detailed description above, this description is not intended to limit the invention to the particular form or embodiments disclosed herein since they are to be recognized as illustrative rather than restrictive, and it will be obvious to those skilled in the art that the invention is not so limited. Thus, the invention is declared to cover all changes and modifications of the specific embodiments of the invention herein disclosed for purposes of illustration which do not constitute departures from the spirit and scope of the invention.

The embodiments of the invention in which an exclusive property or privilege is claimed are defined as follows:

1. A die apparatus for producing thermoplastic pipe, the apparatus comprising (a) a housing including a bore therethrough, the bore having an inlet and a discharge end;

(b) a mandrel supported within the bore and defining therein an annular extrusion passageway for transporting an annular stream of a thermoplastic material therethrough;

(c) a sleeve radially movable within the housing, the sleeve circumscribing the mandrel to define a continuation of the extrusion passageway for transporting an annular stream of thermoplastic material therethrough; and (d) means in said sleeve for selectively heating a section of the sleeve to increase the temperature of the thermoplastic material, reducing the viscosity thereof and thereby changing the thickness of the annular stream of thermoplastic material transported in proximity thereto; and (e) radial expansion means, located in and positioned circumferentially about the housing, in engagement with said sleeve to radially reposition the sleeve within the housing when heated; and (f) control means for causing heating of a selected section of said sleeve and for simultaneously causing heating of a diametrically opposed radial expansion means.

2. The die apparatus of claim 1 wherein the radial expansion means comprises a plurality of adjustable members circumferentially positioned about the housing in proximity to the sleeve, each said adjustable member including a heating element to cause the adjustable member to change radially in size when heated.

3. The die apparatus of claim 2 wherein said means for selectively heating a section of said sleeve and of said heating elements comprise electrically resistive elements.

4. The die apparatus of claim 1 wherein
(a) the sleeve heating means and the housing heating means are aligned parallel to the bore; and
(b) the sleeve heating means and the housing heating means are commonly controlled.

* * * * *